No. 677,140. Patented June 25, 1901.
O. T. OWENS.
DISK HARROW.
(Application filed Oct. 26, 1900.)
(No Model.)
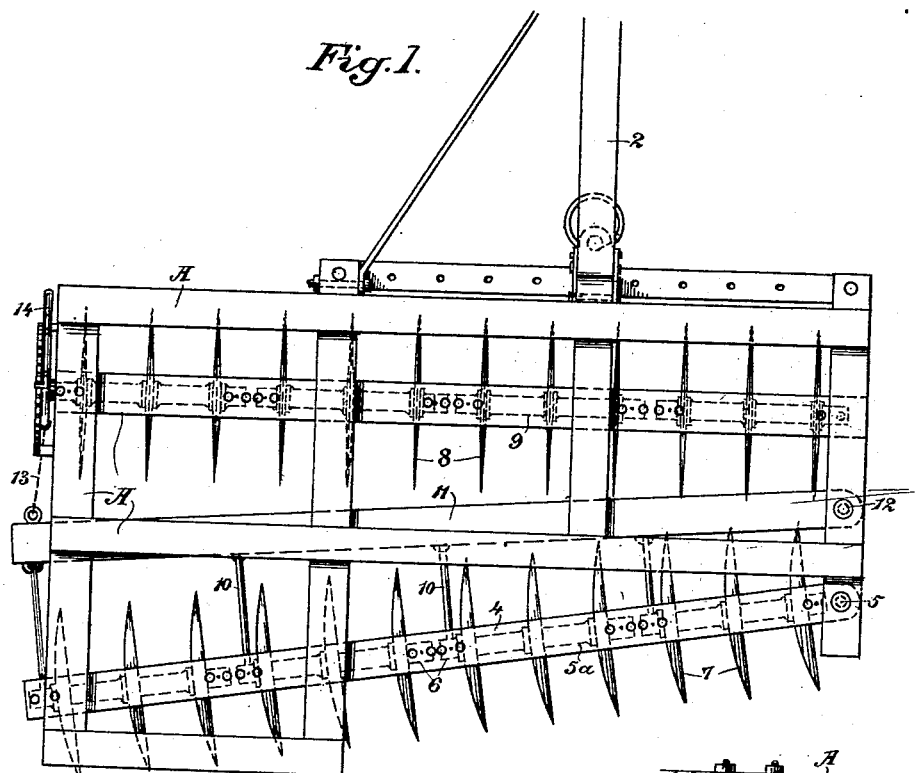
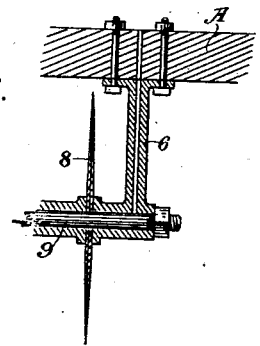
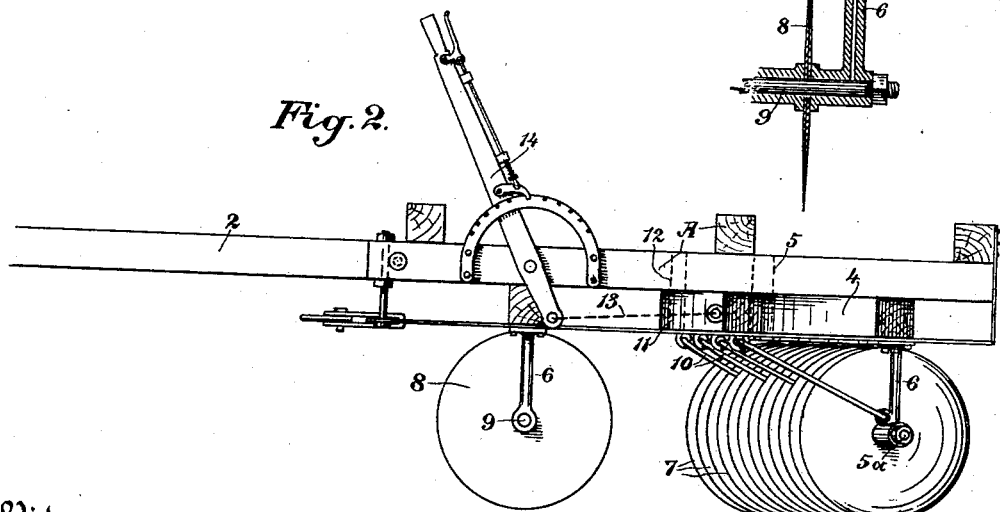
Witnesses
Inventor
Owen T. Owens
By Dewey Strong & Co.
Attys

UNITED STATES PATENT OFFICE.

OWEN T. OWENS, OF ALTAMONT, CALIFORNIA, ASSIGNOR OF ONE-HALF TO J. E. ALLISON, OF SAN FRANCISCO, CALIFORNIA.

DISK HARROW.

SPECIFICATION forming part of Letters Patent No. 677,140, dated June 25, 1901.

Application filed October 26, 1900. Serial No. 34,411. (No model.)

*To all whom it may concern:*

Be it known that I, OWEN T. OWENS, a citizen of the United States, residing at Altamont, county of Alameda, State of California, have invented an Improvement in Disk Harrows; and I hereby declare the following to be a full, clear, and exact description of the same.

My invention relates to improvements in harrows. It consists of a series of concavo-convex disks mounted and revoluble upon a shaft, a main frame with a pole attachment for the team, a supplemental frame pivoted at one end to the main frame, so as to swing and stand at an angle with relation thereto, mechanism by which the angle of the supplemental frame and the harrows is regulated, and a series of disk colters mounted upon a shaft upon the main frame and revoluble in lines in front of each of the disk harrows, said colters serving to resist the side thrust of the harrows and both colters and harrows being regulated so as to cut to any desired depth.

My invention also comprises details of construction, which will be more fully explained by reference to the accompanying drawings, in which—

Figure 1 is a plan view of the harrow. Fig. 2 is an end view of the same. Fig. 3 is a section showing the manner of attaching the disks and colters to the frame.

A is a main frame, which may be rectangular or any suitable form, as herein shown.

2 is the pole, hinged to the main frame and having one or more braces extending from it to the main frame and pivoted thereto in line with the pivot or hinge points of the pole, so that the latter may move up or down to accommodate the team to the harrow-frame.

4 is a frame or timber pivoted to the main frame A, as shown at 5, and extending diagonally and transversely from one side of the main frame to the other.

A shaft 5ª is journaled and turnable in suitable brackets or standards, as 6, which are fixed to the lower part of the frame 4, and upon this shaft are carried the concavo-convex steel disks 7, which serve as harrows. When the supplemental frame is held at any desired angle with the main frame and the latter is drawn over the ground, these disks are forced into the ground by the weight and movement of the apparatus, and by reason of their concavo-convex shape they turn the soil into furrows. The position of these disks with the concaved faces all in one direction has a tendency to force the harrow to one side with reference to the line of travel, and in order to resist this tendency and to hold the harrows up to their work I have shown a series of disk-shaped circular colters 8, which are fixed upon a shaft, as 9, which is journaled and turnable in brackets or standards upon the front timber of the main frame A.

The colters 8 are so disposed with relation to the disk harrows 7 that the latter follow approximately in line with the colters when the machine is drawn over the ground, and the colters sinking into the ground and presenting their flat surfaces to resist the side pressure of the disk harrows will hold the latter up to their work.

The supplemental beam 4 is connected by rods, as 10, with the second beam 11, which is fulcrumed, similarly to the beam 4, to one side of the main frame, as at 12. The opposite end of the lever-beam 11 is connected by a chain 13 with a hand-lever 14, so that by moving this lever 14 the end of the supplemental harrow-carrying frame which is connected with it can be moved forward or back, and thus change the angle of the disks 7 and correspondingly change the depth to which they will enter the soil; but whatever the depth of the cut the colters will always act to resist the side draft and cause the harrows to travel in a direct line and turn the soil into symmetrical furrows and without any objectionable dead furrows.

A harrow constructed in this manner can be used upon side hills, turning the furrow either up or down as it travels along or around the hill in an approximately horizontal line, and whichever way the harrows may be working they will be held up to their work and prevented from side movement.

The object of the loose or chain connection 13 is to assist in turning the harrow-frame to change the direction of travel when necessary.

The action of this device will be as follows: When the end of a furrow has been reached or a turn becomes necessary, the team being turned as to the left, the harrows remain in the ground, and thus hold the frame 4 11 approximately stationary. The main frame A, however, will follow the movements of the team and pivoting at some central point or points near to the right side the outer or left end will be thrown backward, the chain 13 allowing this movement, so that the main frame swings backwardly without disturbing the position of the supplemental frame and the harrows until the turn of the team is well under way. The advance of the team will then commence to pull upon the right end of the main frame, and as the harrow becomes straightened out in its new direction the main frame will advance with relation to the harrow-frame and the chain will be again straightened out until the harrows and their frame have taken their normal position with relation to the main frame and the new direction of travel. In this manner and by the use of the pole connection with the harrow-frame I am enabled to perfectly control its movements and to turn it easily without raising the harrows out of the ground for the purpose.

Having thus described my invention, what I claim as new, and desire to secure by Letters Patent, is—

1. The combination of turnable disks, disk-shaped colters journaled to travel approximately in front of the first-named disks and to enter the ground so as to resist the side thrust of said latter disks, and means for supporting the first-named disks and permitting them to be turned and held at an angle with relation to the colters.

2. The combination in a harrow of a series of concavo-convex disks mounted and turnable, a frame upon which the disk-shaft is carried, a main frame to which the harrow-frame is pivoted at one end and a series of colters carried upon a shaft journaled upon the main frame so that the colters stand approximately in line with the harrows, with their planes in the line of travel of the apparatus.

3. A harrow comprising a main frame, a supplemental frame pivoted thereto at one side extending diagonally across the main frame, concavo-convex disks mounted upon a shaft, said shaft being journaled to the supplemental frame, a shaft journaled on the front of the main frame with flat disk colters fixed thereon in line approximately in front of the harrows, a pole hinged to the front of the harrow-frame so as to be vertically movable with relation thereto, and a brace extending from the pole to the harrow-frame.

4. The combination in a harrow of a main frame with a pole hinged to the front, a supplemental frame pivoted at one side to the main frame, standards carried by the supplemental frame, a shaft journaled and turnable in said standards, concavo-convex disks fixed to said shaft, a shaft journaled in standards at the front of the main frame, flat disk colters fixed to said shaft and revoluble approximately in line with the line of travel of the disk harrows, a lever-arm with which the supplemental frame is connected and by which its angle with relation to the main frame is changed or regulated.

5. The combination in a harrow of a main frame, with pole hinged thereto, a supplemental frame pivoted at one side to the main frame, revoluble disks mounted upon a shaft which is journaled and turnable upon the supplemental frame, flat disk colters mounted upon a shaft journaled and turnable upon the front of the main frame with the colters approximately in the line of travel of the disk harrows, a lever fulcrumed upon the main frame, a flexible connection between said lever and the supplemental harrow-frame whereby the angle of the latter with relation to the main frame is changed, said flexible connection allowing an independent backward movement of the main frame with relation to the harrow-frame when turning or changing direction.

In witness whereof I have hereunto set my hand.

OWEN T. OWENS.

Witnesses:
S. H. NOURSE,
CHAS. E. TOWNSEND.